United States Patent
Shim et al.

(10) Patent No.: US 6,466,287 B1
(45) Date of Patent: Oct. 15, 2002

(54) METHOD FOR FORMING A REFLECTOR OF A REFLECTIVE CRYSTAL DISPLAY

(75) Inventors: Hwan Su Shim, Kyoungki-do; Dong Hae Seo, Taegu; Sang Un Choi, Kyoungki-do, all of (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 41 days.

(21) Appl. No.: 09/606,974

(22) Filed: Jun. 28, 2000

(30) Foreign Application Priority Data

Jun. 29, 1999 (KR) ............................................. 99-25288

(51) Int. Cl.[7] ............................................. G03F 1/1335
(52) U.S. Cl. ............................. 349/113; 349/155; 430/7
(58) Field of Search ................................. 349/113, 155; 430/7

(56) References Cited

U.S. PATENT DOCUMENTS

| | | | | |
|---|---|---|---|---|
| 5,204,765 A | * | 4/1993 | Mitsui et al. | 349/113 |
| 5,500,750 A | * | 3/1996 | Kanbe et al. | 349/113 |
| 5,805,252 A | * | 9/1998 | Shimada et al. | 349/113 |
| 5,917,459 A | * | 6/1999 | Oh et al. | 349/113 |
| 6,097,459 A | * | 8/2000 | Shimada et al. | 349/113 |

FOREIGN PATENT DOCUMENTS

| | | |
|---|---|---|
| JP | 56143416 | 11/1981 |
| JP | 58223119 | 12/1983 |
| JP | 60192918 | 10/1985 |
| JP | 60221729 | 11/1985 |
| JP | 61261723 | 11/1986 |
| JP | 62237430 | 10/1987 |
| JP | 01120529 | 5/1989 |
| JP | 02216126 | 8/1990 |
| JP | 04178631 | 6/1992 |
| JP | 05053088 | 3/1993 |
| JP | 06148609 | 5/1994 |
| JP | 11109390 | 4/1999 |

* cited by examiner

*Primary Examiner*—William L. Sikes
*Assistant Examiner*—Julie Ngo
(74) *Attorney, Agent, or Firm*—Ladas & Parry

(57) ABSTRACT

Disclosed is a method for forming a reflector of a reflective LCD capable of improving a viewing angle characteristic while simplifying a forming process, the method comprising the steps of: applying a photoresist film on an insulating substrate; dispersing a plurality of spacers over a surface of the photoresist film; curing the photoresist film; rubbing the spacers-dispersed and cured photoresist film, thereby removing the spacers; and performing a vapor deposition of a metal film having a high reflectivity on the photoresist film.

5 Claims, 4 Drawing Sheets

METHOD FOR FORMING A REFLECTOR OF A REFLECTIVE CRYSTAL DISPLAY

BACKGROUND OF THE INVENTION

1. Field of the Invention

The present invention generally relates to a reflective liquid crystal display, and more particularly to a method for forming a reflector of a reflective liquid crystal display capable of improving a viewing angle characteristic while simplifying a forming process.

2. Description of the Related Art

As well known, since a liquid crystal display device (hereinafter referred as LCD) is thin in thickness, light in weight and low in power consumption, it is in the spotlight as a display device for personal office automation equipments, an image display device of a television, and so forth. In particular, a reflective LCD is very useful as a portable display element requiring low power consumption because it does not need backlight, and thus there is increasing demand for the reflective LCD as the market for portable equipment, such as portable telephones, grows wider.

Now, a description will be given for a structure of the reflective LCD with reference to FIG. 1. This reflective LCD roughly consist of a lower plate 10, an upper plate 20 and a liquid crystal layer 30 interposed therebetween.

The lower plate 10 includes a lower substrate 1, a thin film transistor (hereinafter referred as TFT) 6 formed on a portion of an inner side of the lower substrate 1, an insulating film 7 vapor-deposited on the lower substrate 1 and the TFT 6, a pixel electrode 8 formed on the insulating film 7, and a lower aligning film 9 formed on the insulating film 7 and the pixel electrode 8.

The upper plate 20 includes an upper substrate 11, a black matrix 12 formed on a portion of an inner side of the upper substrate 11 corresponding to the portion on which the TFT is formed, a color filter 13 formed on both sides of the black matrix 12, a common electrode 14 formed on the black matrix 12 and the color filter 13, and an upper aligning film 15 formed on the common electrode 14.

In addition, the TFT 6 consists of a gate electrode g, a gate insulating film 3, a semiconductor layer 4a, an ohmic contact layer 4b, an etch stopper 5 and source/drain electrodes s, d.

The insulating film 7 is preferably an organic insulating film and has an uneven surface. The uneven surface is obtained by means of a well-known process such as a lithography process or a holography process. Preferably, each of the lower and upper aligning films 9, 15 is a horizontal aligning film.

It is preferred that the pixel electrode 8 is composed of an aluminum metal film having a superior interface reflection characteristic. Also, the pixel electrode 8 is connected to the drain electrode d of the TFT 6 through a contact hole h formed in the insulating film 7. Further, the pixel electrode 8 has an uneven portion 8a due to the fact that the surface of the lower insulating film 7 is uneven. The uneven portion 8a is provided in order to improve a poor viewing angle characteristic by making an incident light from the upper plate 20 be reflected at a larger angle. In the reflective LCD, the pixel electrode 8 usually serves as a reflector.

The liquid crystal layer 30 includes a plurality of liquid crystal molecules 21, and a plurality of dyeing agents 22 which selectively absorb or block the incident light. The dyeing agent 22 has a property to absorb a light passing its long axis and to transmit a light passing its short axis.

The reflective LCD operates according to a principle as described below.

First, when an electric field is not applied between the pixel electrode and the common electrode, the liquid crystal molecules and the dyeing agents in the liquid crystal layer are aligned under the influence of the horizontal aligning film in a state that their respective long axes are parallel to the substrates. If an incident light is projected from the upper plate in this state, the incident light traveling toward the pixel electrode is absorbed in part by the dyeing agents because it passes through the long axes of the dyeing agents, and the rest of the incident light reaches the pixel electrode. Subsequently, the reached incident light is reflected from the pixel electrode and then travels toward the upper plate. In the course of this travel, the light passes through the long axes of the dyeing agents again and thus the dyeing agents absorbing most of the light, which results in a dark state of an image.

On the contrary, when an electric field is applied between the pixel electrode and the common electrode, the liquid crystal molecules and the dyeing agent are aligned in a state that their respective long axes are parallel to a direction of the electric field. If an incident light is projected from the upper plate in this state, the incident light reaches the pixel electrode without being absorbed by the dyeing agent because it passes through short axes of the dyeing agents. Thus, a white state is obtained.

Although the surface unevenness of the pixel electrode, i.e., the reflector is effective to improve the poor viewing angle characteristic of the reflective LCD, there is a problem that a process of forming the surface unevenness, i.e., a non-leveling process is somewhat complicated.

Further, in such a mode that the surface unevenness is used to reflect the incident light at a larger angle, there is another problem that the quantity of light reflected in a normal direction of image, that is, a main viewing direction of a user (hereinafter referred as main viewing angle direction) is very small because most of the incident light is reflected in a lateral viewing angle direction, so that a transmittance in the main viewing angle direction is very low.

SUMMARY OF THE INVENTION

Accordingly, the present invention has been made to solve the above-mentioned problems occurring in the prior art, and it is an objective of the present invention to provide a method for forming a reflector of a reflective LCD, which enables the reflector to be provided with surface unevenness by a simple process.

Another objective of the present invention is to provide a method for forming a reflector, which makes it possible to improve a transmittance in a main viewing angle direction by providing irregular surface unevenness.

To achieve these objectives, there is provided a method for forming a reflector of a reflective LCD in accordance with one aspect of the present invention, the method comprising the steps of: coating a photoresist film on an insulating substrate; dispersing a plurality of spacers over a surface of the photoresist film; curing the photoresist film; rubbing the spacers-dispersed and cured photoresist film, thereby removing the spacers; and depositing a metal film having a high reflectivity on the photoresist film.

Preferably, the metal film having a high reflectivity is an aluminum film. Also, it is preferred that respective sizes of the spacers are unequal. Further, it is desirable that respective quantities of the spacers dispersed over red, green and blue sub pixels are different from one another.

In accordance with another aspect of the present invention, the step of dispersing the spacers over red, green and blue sub pixels while differentiating respective sizes and dispensing quantities of the spacers comprises: providing a red sub pixel opening mask on the photoresist film-coated insulating substrate and dispersing spacers having a first size and a first quantity over the exposed photoresist film portion of the red sub pixel region; removing the red sub pixel opening mask; providing a green sub pixel-opening mask on the photoresist film-coated insulating substrate and dispersing spacers having a second size and a second quantity over the exposed photoresist film portion of the green sub pixel region; removing the green sub pixel opening mask; providing blue sub pixel opening mask on the photoresist film-coated insulating substrate and dispersing spacers having a third size and a third quantity on the exposed photoresist film portion of the blue sub pixel region; and removing the blue sub pixel opening mask.

BRIEF DESCRIPTION OF THE DRAWINGS

The above objectives, and other features and advantages of the present invention will become more apparent after a reading of the following detailed description when taken in conjunction with the drawings, in which.

DETAILED DESCRIPTION OF PREFERRED EMBODIMENTS

Hereinafter, a preferred embodiment of the present invention will be described with reference to the accompanying drawings. In the following description and all drawings, the similar parts having the same function will be designated by the similar numerals, and so repetition of the description on the same parts will be omitted. Further, since this embodiment relates to a method for forming a reflector having irregular surface unevenness, a description on other components than the reflector and manufacturing processes thereof will be excluded.

Figure 1:
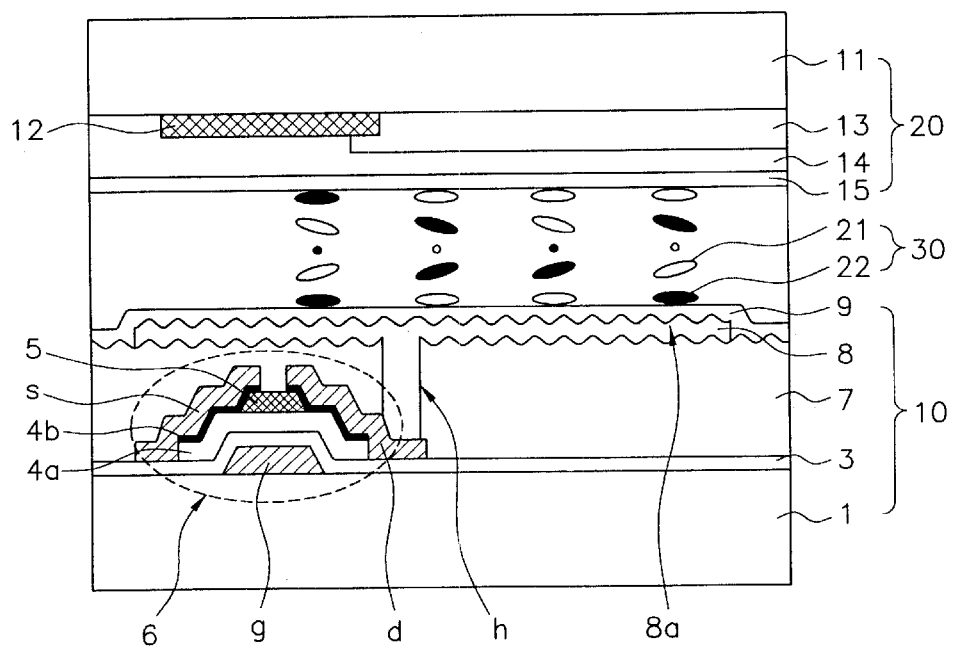
FIG. 1 is a sectional view of a conventional reflective LCD.
Figure 2A:
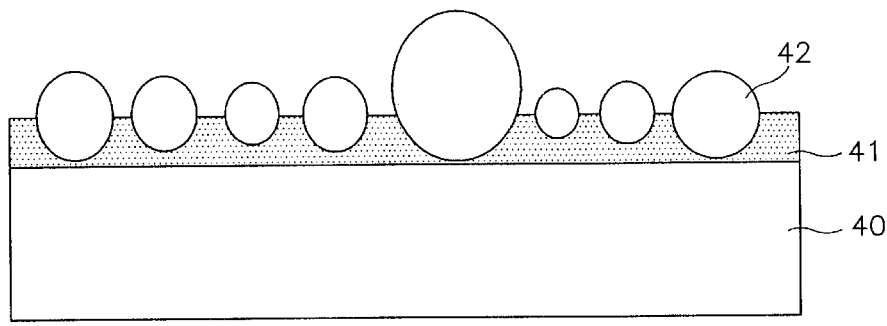
FIGS. 2A to 2E are sectional views of each process for explaining a method for forming a reflector of reflective LCD according to a preferred embodiment of the present invention.

Referring to FIG. 2A, there is provided an insulating substrate such as a glass substrate 40 on which a TFT (not shown) is formed, and a photoresist film 41 is applied on the glass substrate 40. A plurality of spacers 42 are randomly dispersed over a surface of the photoresist film 41, material of the spacers is limited to any specific one and respective sizes of the spacers are unequal. Also, the dispersed spacers are partially embedded in the photoresist film 41 because the photoresist film 41 is in an uncured state.

Figure 2B:
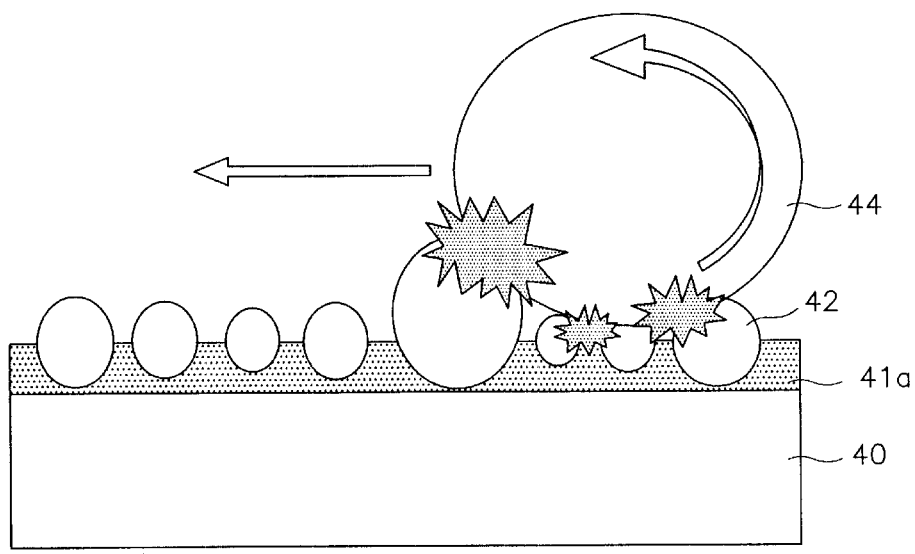
Figure 2C:
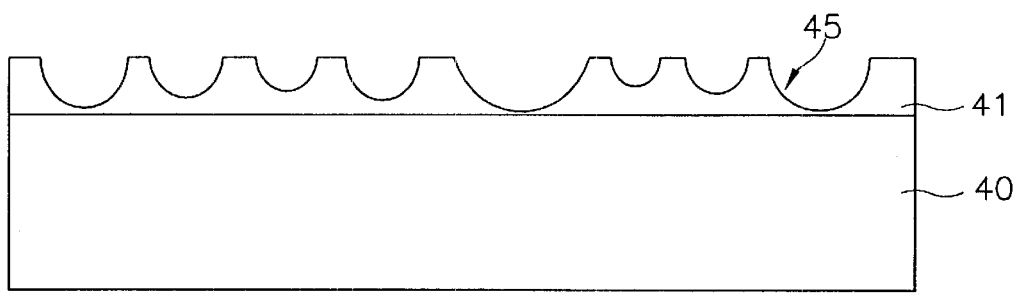

Referring to FIGS. 2B and 2C, the photoresist film on the surface of which the spacers 42 are dispersed is cured. Reference numeral 41a designates the cured photoresist film. Thereafter, the surface of the spacers-dispersed and cured photoresist film 41a is rubbed by using a roller 44. At this time, the spacers 42 are removed from the photoresist film 41a by an external force, i.e., an impact resulted from the roller 44, and thus a plurality of hemispheric depressions having different diameters are formed on the surface of the photoresist film 41a.

Figure 2D:
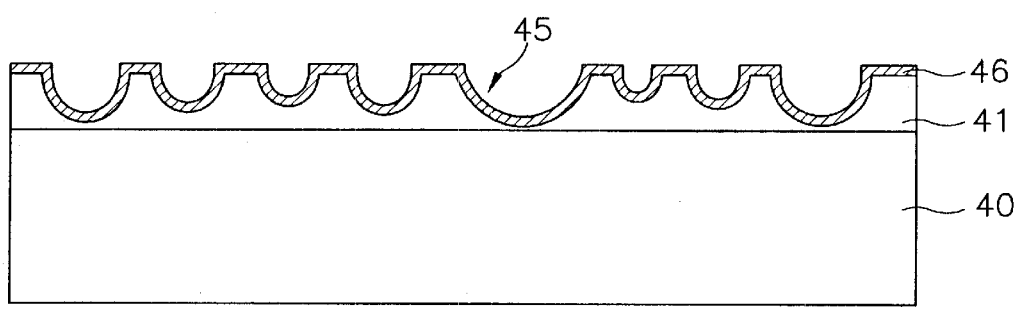

Referring to FIG. 2D, a reflector 46 is formed on the photoresist film 41a by vapor-depositing a predetermined metal film in a state that the photoresist film is formed with hemispheric depressions 45 having different diameters. In this case, the reflector 46 is preferably made of an aluminum film having a high reflectivity. Also, the reflector 46 has an irregular surface because it is formed along the irregular surface of the photoresist film 41a disposed thereunder. Further, the reflector 46 functions as a pixel electrode so long as an additive reflector is not formed on a rear surface of the glass substrate 40.

Figure 2E:
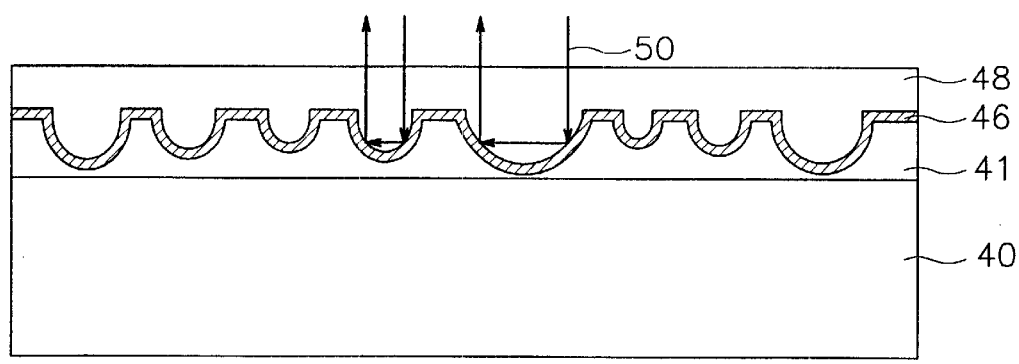

Referring to FIG. 2E, an aligning film 48 is formed on the reflector 46 having the irregular surface.

In accordance with this embodiment, the reflector having irregular surface unevenness can be formed by means of steps of dispersing the spacers on the surface of the photoresist film and rubbing the spacers-dispersed photoresist film. Therefore, the method according to the present invention makes it possible to simplify the forming process in comparison with the conventional method because it does not require a lithography process or holography process.

In addition, since the surface unevenness of the reflector is formed in the shape of hemispheric depression, an effect of light collection can be obtained. That is, as shown in FIG. 2E, most of an incident light 50 is reflected in a main viewing angle direction, and thus a transmittance in the main viewing angle direction is improved.

Furthermore, optimization of the transmittance and the viewing angle in the reflective LCD can be realized by differentiating respective sizes and quantities of the spacers dispersed over red, green and blue sub pixels. Now, a description will be given for a method of dispersing the spacers over the red, green and blue sub pixels while differentiating respective sizes and dispersing quantities of the spacers with reference to FIG. 3.

Figure 3:
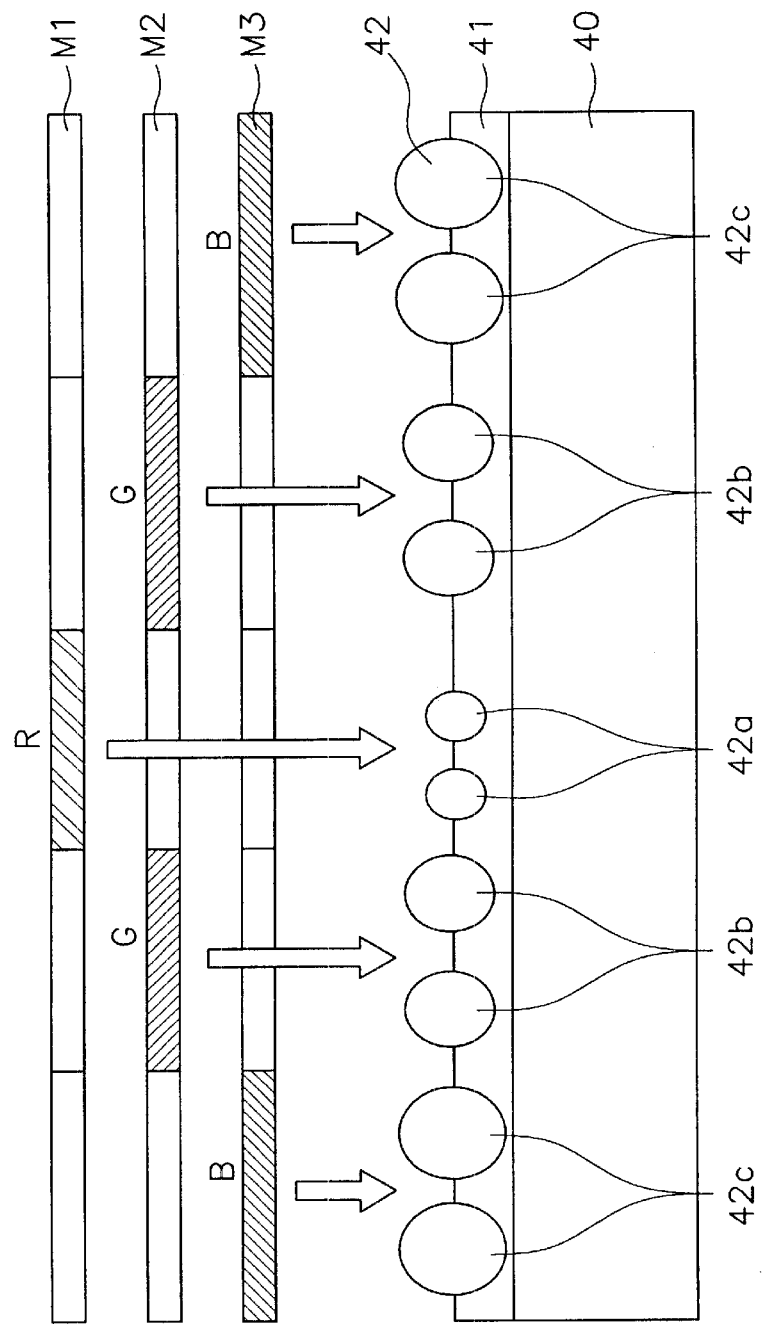
FIG. 3 is a sectional view for explaining a step of dispersing the spacers over red, green and blue sub pixels while differentiating respective sizes and dispersing quantities of the spacers.

Referring to FIG. 3, a red sub pixel opening mask M1 is provided on a photoresist film-coated glass substrate 40, and first spacers 42a having a first size and a first quantity are dispersed over an exposed portion of the photoresist film through a red sub pixel region of the red sub pixel opening mask. Next, the red sub pixel opening mask M1 is removed.

Thereafter, a green sub pixel opening mask M2 is provided on the photoresist film-coated glass substrate 40, and second spacers 42b having a second size and a second quantity are dispersed on an exposed portion of the photoresist film through a green sub pixel region of the green sub pixel opening mask. Next, the green sub pixel opening mask M2 is removed.

Thereafter, a blue sub pixel opening mask M3 is provided on the photoresist film-coated glass substrate 40, and third spacers 42c having a third size and a third quantity are dispersed on an exposed portion of the photoresist film through a blue sub pixel region of the blue sub pixel opening mask. Next, the blue sub pixel opening mask M3 is removed.

In a meanwhile, the above embodiment has illustrated and described a case that the spacers are removed by means of the rubbing process, but the spacers may be removed by using an organic solvent. Also, while the method for forming the reflector with both functions of the reflector and the pixel electrode has been illustrated and described in the embodiment, the method according to the present invention may be applied to a case that the reflector is formed outside of the glass substrate.

In the method for forming the reflector of the reflective LCD according to the present invention as described above, the surface unevenness can be formed by means of steps of dispersing the spacers on the photoresist film and rubbing the spacers-dispersed photoresist film. Therefore, the forming process is simplified.

Further, the surface unevenness in the form of the hemispheric depression causes most of the incident light to reflect in the main viewing angle direction of the image, thereby improving the transmittance in the main viewing angle direction. As a result of that, the viewing angle characteristic of the reflective LCD is more enhanced.

While the present invention has been illustrated and described under considering a preferred specific embodiment thereof, it will be understood by those skilled in the art that the present invention is not limited to the specific embodiment, and various changes and modifications and equivalents may be made without departing from the true scope of the present invention.

What is claimed is:

1. A method for forming a reflector of a reflective liquid crystal display, comprising the steps of:
    coating a photoresist film on an insulating substrate;
    dispersing a plurality of spacers over a surface of the photoresist film;
    curing the photoresist film having spacers dispersed thereon;
    rubbing the surface of the photoresist film, having spacers dispersed thereon to remove the spacers; and
    depositing a metal film having a high reflectivity on the photoresist film.

2. The method as claimed in claim 1, wherein sizes of the spacers are unequal.

3. The method as claimed in claim 1, wherein the step of dispersing the plurality of spacers further comprises the steps of:
    dispersing the plurality of spacers over red, green and blue sub pixels;
    differentiating respective sizes and dispensing quantities of spacers;
    providing a red sub pixel opening mask on the photoresist film-coated insulating substrate and dispersing spacers having a first size and a first quantity over an exposed portion of the photoresist film through a red sub pixel region of the red sub pixel opening mask;
    removing the red sub pixel opening mask;
    providing a green sub pixel opening mask on the photoresist film-coated insulating substrate and dispersing spacers having a second size and a second quantity over an exposed portion of the photoresist film through a green sub pixel region of the green sub pixel opening mask;
    removing the green sub pixel opening mask;
    providing a blue sub pixel opening mask on the photoresist film-coated insulating substrate and dispersing spacers having a third size and a third quantity on an exposed portion of the photoresist film through a blue sub pixel of the blue sub pixel opening mask; and
    removing the blue sub pixel opening mask.

4. The method as claimed in claim 3, wherein the respective quantities of the spacers dispersed over red, green and blue sub pixels are different from one another.

5. The method as claimed in claim 1, wherein the metal film having a high reflectivity is an aluminum film.

* * * * *